(12) United States Patent
Li et al.

(10) Patent No.: US 10,520,000 B2
(45) Date of Patent: Dec. 31, 2019

(54) CONNECTING DEVICE AND DISPLAY SCREEN WITH THE SAME

(71) Applicant: Shenzhen LEYARD Opto-Electronic CO., LTD., Shenzhen, Guangdong (CN)

(72) Inventors: Bingfeng Li, Shenzhen (CN); Wulin He, Shenzhen (CN)

(73) Assignee: Shenzhen LEYARD Opto-Electronic CO., LTD., Shenzhen, Guangdong (CN)

( * ) Notice: Subject to any disclaimer, the term of this patent is extended or adjusted under 35 U.S.C. 154(b) by 264 days.

(21) Appl. No.: 15/115,551

(22) PCT Filed: Nov. 19, 2015

(86) PCT No.: PCT/CN2015/095062
§ 371 (c)(1),
(2) Date: Jul. 29, 2016

(87) PCT Pub. No.: WO2016/091053
PCT Pub. Date: Jun. 16, 2016

(65) Prior Publication Data
US 2017/0268554 A1    Sep. 21, 2017

(30) Foreign Application Priority Data
Dec. 12, 2014    (CN) .......................... 2014 1 0770482

(51) Int. Cl.
*F16B 19/02*    (2006.01)
*F16B 21/09*    (2006.01)
*F16B 5/00*    (2006.01)

(52) U.S. Cl.
CPC ............ *F16B 19/02* (2013.01); *F16B 5/0088* (2013.01); *F16B 21/09* (2013.01); *Y10T 403/599* (2015.01)

(58) Field of Classification Search
CPC ........ F16B 19/02; F16B 21/09; F16B 5/0024; F16B 5/0084; F16B 5/0088; G02F 1/133;
(Continued)

(56) References Cited

U.S. PATENT DOCUMENTS 5,451,082 A * 9/1995 Murai .................. E05B 65/523
                                                    24/115 G
5,996,728 A    12/1999 Stark
(Continued)

FOREIGN PATENT DOCUMENTS

CN        202732570 A    2/2013
CN        103267048 A    8/2013
(Continued)

OTHER PUBLICATIONS

Search report for International Patent Application No. PCT/CN2015/095062, dated Feb. 29, 2016.
(Continued)

*Primary Examiner* — Josh Skroupa
(74) *Attorney, Agent, or Firm* — Pearl Cohen Zedek Latzer Baratz LLP

(57) ABSTRACT

A connecting device and a display screen with the same. Wherein, the connecting device includes: a first connecting member, including a first fixed part, a first movable part and a first elastic part positioned between the first fixed part and the first movable part, the first fixed part being provided with a first component connecting part and the first movable part being provided with a mounting through hole; and a second connecting member matched with the first connecting member, the first movable part having a connection state of causing the hole wall of the mounting through hole to extend into the accommodation groove and a separation state of causing the hole wall of the mounting through hole to extend out of the accommodation groove and the first movable part
(Continued)

being in the connection state only under the action of the first elastic part.

10 Claims, 3 Drawing Sheets

(58) Field of Classification Search
CPC .............. Y10T 403/60; Y10T 403/602; Y10T 403/606; Y10T 403/7015; Y10T 403/599; Y10T 24/4501; Y10T 24/45094
USPC ........ 403/326, 327, 329, 353; 292/347, 348, 292/352
See application file for complete search history.

(56) References Cited

U.S. PATENT DOCUMENTS

| | | | | |
|---|---|---|---|---|
| 7,128,514 | B1* | 10/2006 | Le Beau | F16B 37/0892 411/433 |
| 2004/0037636 | A1 | 2/2004 | Babcock et al. | |
| 2005/0069382 | A1 | 3/2005 | Atwater et al. | |
| 2007/0029460 | A1* | 2/2007 | Fitzler | F16B 21/183 248/560 |
| 2009/0179111 | A1* | 7/2009 | Ebner | B64C 1/066 244/131 |
| 2010/0303542 | A1* | 12/2010 | Costabel | F16B 5/0628 403/326 |
| 2014/0317889 | A1* | 10/2014 | Hida | B60R 13/04 24/293 |
| 2015/0354610 | A1* | 12/2015 | McClure | F16B 2/12 24/649 |
| 2015/0368949 | A1* | 12/2015 | Smith | E05D 15/0639 16/326 |
| 2017/0114817 | A1* | 4/2017 | McClure | F16B 2/12 |

FOREIGN PATENT DOCUMENTS

| | | |
|---|---|---|
| CN | 203176093 U | 9/2013 |
| CN | 103544894 A | 1/2014 |
| CN | 104482005 A | 4/2015 |
| CN | 204357869 U | 5/2015 |
| FR | 2 673 250 A1 | 8/1992 |

OTHER PUBLICATIONS

Search report for European Patent Application No. 15 86 8627, dated Jul. 20, 2017.
Search report for Chinese Patent Application No. 2014107704829, dated Mar. 16, 2018.
Supplementary Search report for Chinese Patent Application No. 2014107704829, dated Mar. 16, 2018.
Office Action for Japanese Patent Application No. 2017-549572, dated Apr. 20, 2018.
Office Action for Korean Patent Application No. 10-2016-702138, dated Dec. 12, 2017.
Office Action for Canadian Patent Application No. 2,938,063, dated Apr. 6, 2018.

* cited by examiner

CONNECTING DEVICE AND DISPLAY SCREEN WITH THE SAME

CROSS-REFERENCE TO RELATED APPLICATIONS

This application is a National Phase application of PCT International Application No. PCT/CN2015/095062, International Filing Date Nov. 19, 2015, claiming priority of Chinese Patent Application No. 201410770482.9, filed Dec. 12, 2014, the entirety of which is hereby incorporated by reference

TECHNICAL FIELD OF THE INVENTION

The invention relates to the technical field of assembling, and in particular to a connecting device and a display screen with the same.

BACKGROUND OF THE INVENTION

At present, a Light-Emitting Diode (LED) display screen may be mounted under coordination of multiple persons, and cooperation of more labor force is required by site mounting of a screen body, which causes waste of labor cost, economic cost, environmental protection resources and the like.

SUMMARY OF THE INVENTION

The invention is intended to provide a connecting device and a display screen with the same, which reduce the amount of labor and improve mounting efficiency.

In order to achieve the purpose, according to one aspect of the invention, a connecting device is provided, which comprises: a first connecting member, comprising a first fixed part, a first movable part provided in a manner of moving in a first direction and a first elastic part positioned between the first fixed part and the first movable part, the first fixed part being provided with a first component connecting part and the first movable part being provided with a mounting through hole which is through in a second direction perpendicular to the first direction; and a second connecting member matched with the first connecting member, provided with a second component connecting part and an accommodation groove for accommodating a hole wall of the mounting through hole, the second connecting member having an inward extension state of extending into the mounting through hole and an outward shifting state of shifting out of the mounting through hole, the first movable part having a connection state of causing the hole wall of the mounting through hole to extend into the accommodation groove and a separation state of causing the hole wall of the mounting through hole to extend out of the accommodation groove and the first movable part being in the connection state under an action of the first elastic part.

Furthermore, the second connecting member comprises a second fixed part and a second movable part provided on the second fixed part in the manner of moving in the second direction, the second component connecting part is formed on the second fixed part, the accommodation groove is formed in the second movable part, and the second movable part has the inward extension state and the outward shifting state.

Furthermore, the accommodation groove is an annular groove, the second fixed part is provided with a threaded hole which is through in the second direction, the second movable part comprises a hanger rod, the accommodation groove is formed in the hanger rod, and the hanger rod is provided with an external threaded section matched with the threaded hole.

Furthermore, the mounting through hole comprises a penetration hole area and a locking hole area which are distributed in the first direction, an area of the locking hole area is smaller than an area of the penetration hole area, and when the first movable part is in the connection state, the second movable part is positioned in the locking hole area and a hole wall of the locking hole area extends into the accommodation groove; and when the first movable part is in the separation state, the second movable part is positioned in the penetration hole area.

Furthermore, the first elastic part is a first compression spring.

Furthermore, the second movable part further comprises a screwing handle fixedly connected with the hanger rod, the second fixed part is positioned between the screwing handle and the first connecting member, and multiple handholding grooves are formed in a circumferential direction of the screwing handle at intervals.

Furthermore, both the first component connecting part and the second component connecting part are screw penetration through holes.

According to the other aspect of the invention, a display screen is provided, which comprises: a first display unit profile with a first connecting part; and a second display unit profile with a second connecting part, the display screen further comprises: the abovementioned connecting device, the first fixed part is fixedly connected with the first connecting part, the second connecting member is fixedly connected with the second connecting part, the first connecting part is positioned between the second connecting part and a first movable part and the first connecting part is provided with a first avoiding through hole for avoiding the second connecting member.

Furthermore, the first connecting member further comprises a locking device provided on the first movable part, the locking device comprises a locking pin and a second elastic member, an acting force of the second elastic member over the locking pin faces the second connecting part, the first connecting part is provided with a second avoiding through hole for avoiding the locking pin, a hole wall of the second avoiding through hole is provided with a sliding chute which allows the locking pin to move, the sliding chute is positioned between the second avoiding through hole and the first avoiding through hole, a chute bottom of the sliding chute is deviated from the second connecting part, a pressing bump extending towards the second avoiding through hole is provided on the second connecting part, the locking pin has a first locking state of extending into the second avoiding through hole and being stopped by the hole wall of the second avoiding through hole and a second locking state of contacting with the pressing bump to move into the sliding chute and being stopped by a chute wall of the sliding chute, and when the locking pin is in the first locking state, the first movable part is in a separation state; and when the locking pin is in the second locking state, the first movable part is in a connection state.

Furthermore, the first connecting part is provided with a guide groove extending in the second direction, and the first movable part is provided with a guided part extending into the guide groove.

According to the technical solutions of the invention, the first fixed part is fixedly connected with a first component, the second connecting member is fixedly connected with a second component, the second connecting member enters the inward extension state and the first movable part is only subjected to the action of the first elastic part, so that the first movable part is in the connection state under the acting force of the first elastic part, the hole wall of the mounting through hole extends into the accommodation groove at this moment, and the first component and the second component are fixed. Force for overcoming the acting force of the first elastic part is applied to the first movable part to cause the first movable part to enter the separation state and cause the hole wall of the mounting through hole to extend out of the accommodation groove, and at this moment, the first connecting member is disconnected from the second connecting member to implement separation of the first component and the second component. In a mounting process, the first movable part may enter the connection state without manual driving, so that the amount of labor is reduced, and moreover, the mounting efficiency is improved. The above analysis shows that the connecting device of the invention reduces the amount of labor and improves the mounting efficiency.

BRIEF DESCRIPTION OF THE DRAWINGS

The drawings of the specification, forming a part of the invention, are adopted to provide further understanding of the invention, and schematic embodiments of the invention and descriptions thereof are adopted to explain the invention and not intended to form improper limits to the invention. In the drawings.

Figure 1:
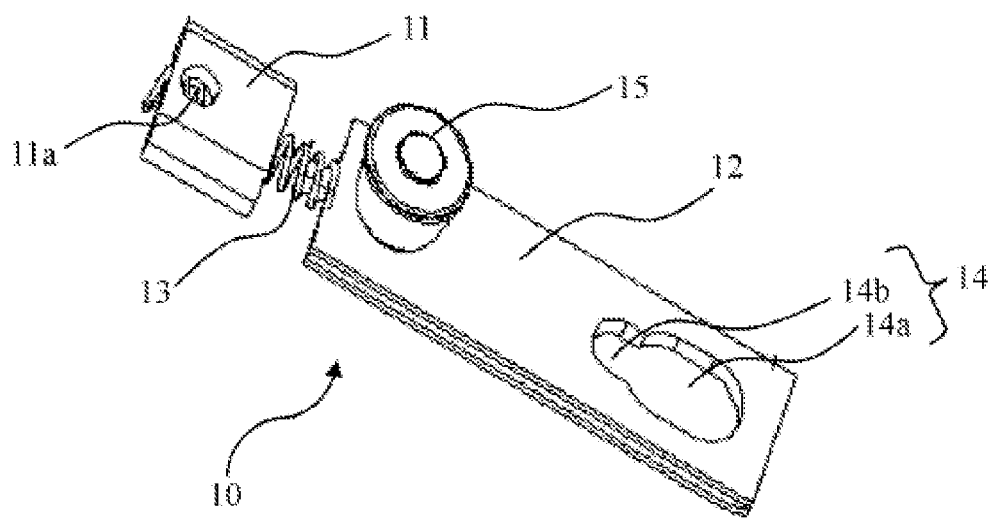
FIG. 1 is a structure diagram of a first connecting member in an embodiment of a connecting device according to the invention.

Wherein, reference signs in the drawings are as follows:
10: first connecting member; 11: first fixed part; 11a: first component connecting part; 12: first movable part; 13: first elastic part; 14: mounting through hole; 14a: penetration hole area; 14b: locking hole area; 15: locking device; 16: locking pin; 17: second elastic member; 18: handheld handle; 20: second connecting member; 20a: second component connecting part; 20b: accommodation groove; 21: second fixed part; 22: second movable part; 23: hanger rod; 24: screwing handle; 30: first display unit profile; 31: first connecting part; 32: first avoiding through hole; 33: second avoiding through hole; 34: sliding chute; 35: guide groove; 40: second display unit profile; 41: second connecting part; 42: pressing bump; and 43: third avoiding through hole.

DETAILED DESCRIPTION OF THE EMBODIMENTS INVENTION

It is important to note that embodiments in the invention and characteristics in the embodiments may be combined under the condition of no conflicts. The invention will be described below with reference to the drawings and the embodiments in detail.

Figure 2:
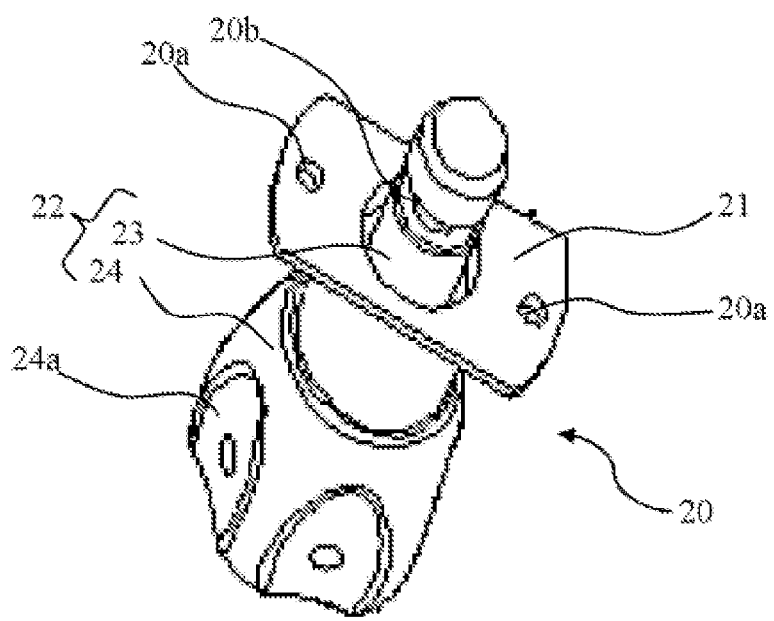
FIG. 2 is a structure diagram of a second connecting member in an embodiment of a connecting device according to the invention.

As shown in FIG. 1 and FIG. 2, a connecting device of the embodiment comprises a first connecting member 10 and a second connecting member 20 matched with the first connecting member 10. The first connecting member 10 comprises a first fixed part 11, a first movable part 12 provided in a manner of moving in a first direction and a first elastic part 13 positioned between the first fixed part 11 and the first movable part 12, the first fixed part 11 is provided with a first component connecting part 11a, and the first movable part 12 is provided with a mounting through hole 14 which is through in a second direction perpendicular to the first direction. The second connecting member 20 is provided with a second component connecting part 20a and an accommodation groove 20b for accommodating a hole wall of the mounting through hole 14, the second connecting member 20 has an inward extension state of extending into the mounting through hole 14 and an outward shifting state of shifting out of the mounting through hole 14, the first movable part 12 has a connection state of causing the hole wall of the mounting through hole 14 to extend into the accommodation groove 20b and a separation state of causing the hole wall of the mounting through hole 14 to shift out of the accommodation groove 20b, and the first movable part 12 is in the connection state only under an action of the first elastic part 13.

According to the connecting device of the embodiment, the first fixed part 11 is fixedly connected with a first component, the second connecting member 20 is fixedly connected with a second component, the second connecting member 20 enters the inward extension state and the first movable part 12 is only subjected to the action of the first elastic part 13, so that the first movable part 12 is in the connection state under acting force of the first elastic part 13, the hole wall of the mounting through hole 14 extends into the accommodation groove 20b at this moment, and the first component and the second component are fixed. Force for overcoming the acting force of the first elastic part 13 is applied to the first movable part 12 to cause the first movable part 12 to enter the separation state and cause the hole wall of the mounting through hole 14 to shift out of the accommodation groove 20b, and at this moment, the first connecting member 10 is disconnected from the second connecting member 20 to implement separation of the first component and the second component. In a mounting process, the first movable part 12 may enter the connection state without manual driving, so that the amount of labor is reduced, and moreover, mounting efficiency is improved. The above analysis shows that the connecting device of the invention reduces the amount of labor and improves the mounting efficiency.

As shown in FIG. 2, in the embodiment, the second connecting member 20 comprises a second fixed part 21 and a second movable part 22 provided on the second fixed part 21 in the manner of moving in the second direction, a second component connecting part 20a is formed on the second fixed part 21, the accommodation groove 20b is formed in the second movable part 22, and the second movable part 22 has the inward extension state and the outward shifting state. With adoption of the structure, when the first movable part 12 is in the connection state, the second movable part 22 may move to connect the first component with the second component more firmly.

As shown in FIG. 2, in the embodiment, the accommodation groove 20b is an annular groove, the second fixed part 21 is provided with a threaded hole which is through in the second direction, the second movable part 22 comprises a hanger rod 23, the accommodation groove 20b is formed in the hanger rod 23, and the hanger rod is provided with an external threaded section matched with the threaded hole. With adoption of the structure, the hanger rod 23 may be screwed to implement arrangement of the second movable part in the manner of moving in the second direction and achieve higher movement accuracy. In addition, as another feasible implementation mode, the second movable part 22 is provided with a rack, the second fixed part 21 is provided with a gear matched with the rack, and the gear may also be driven to rotate to implement arrangement of the second movable part 22 in the manner of moving in the second direction.

As shown in FIG. 1, in the embodiment, the mounting through hole 14 comprises a penetration hole area 14a and a locking hole area 14b which are distributed in the first direction, an area of the locking hole area 14b is smaller than an area of the penetration hole area 14a, and when the first movable part 12 is in the connection state, the second movable part 22 is positioned in the locking hole area 14b and the hole wall of the locking hole area 14b extends into the accommodation groove 20b; and when the first movable part 12 is in the separation state, the second movable part 22 is positioned in the penetration hole area 14a. With adoption of the structure, the first connecting member 10 and the second connecting member 20 may be connected more firmly.

As shown in FIG. 1, in the embodiment, the first elastic part 13 is a first compression spring. Of course, as another feasible implementation mode, the first elastic part 13 may also be a tension spring or an elastic sleeve.

As shown in FIG. 2, in the embodiment, the second movable part 22 further comprises a screwing handle 24 fixedly connected with the hanger rod 23, the second fixed part 21 is positioned between the screwing handle 24 and the first connecting member 10, and multiple handholding grooves 24a are formed in a circumferential direction of the screwing handle 24 at intervals. With adoption of the structure, the hanger rod 23 may be conveniently screwed.

As shown in FIG. 1 and FIG. 2, in the embodiment, both the first component connecting part 11a and the second component connecting part 20a are screw penetration through holes.

Figure 3:
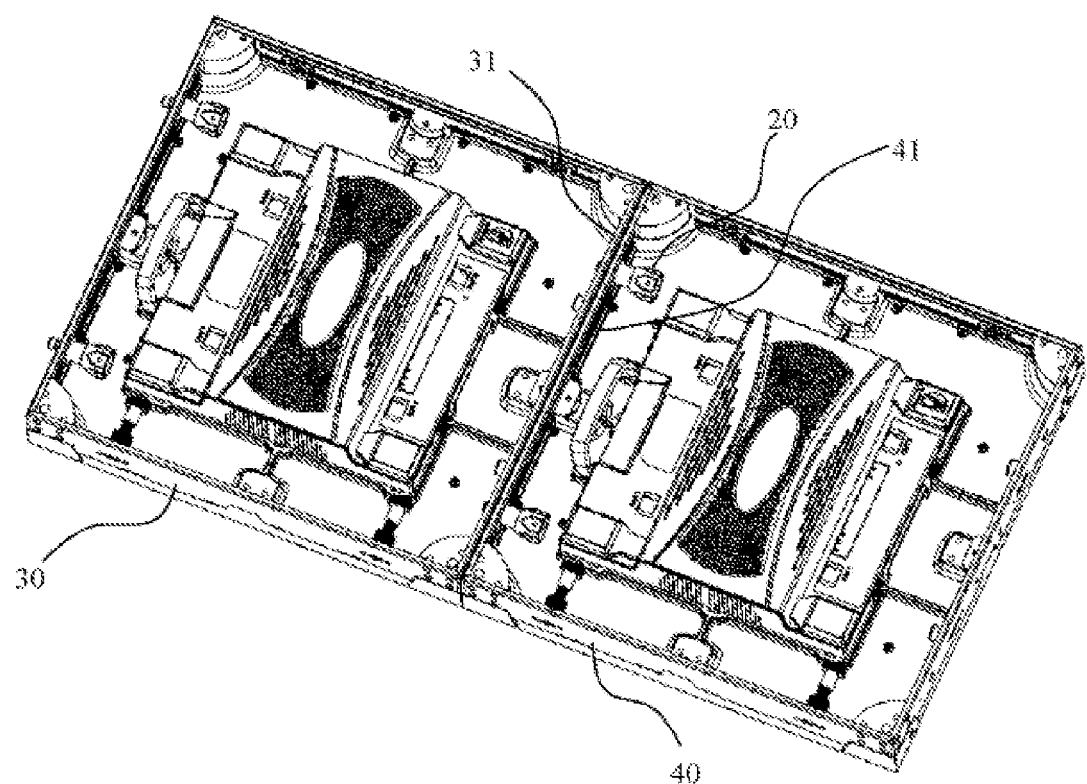
FIG. 3 is a structure diagram of an embodiment of a display screen according to the invention.
Figure 4:
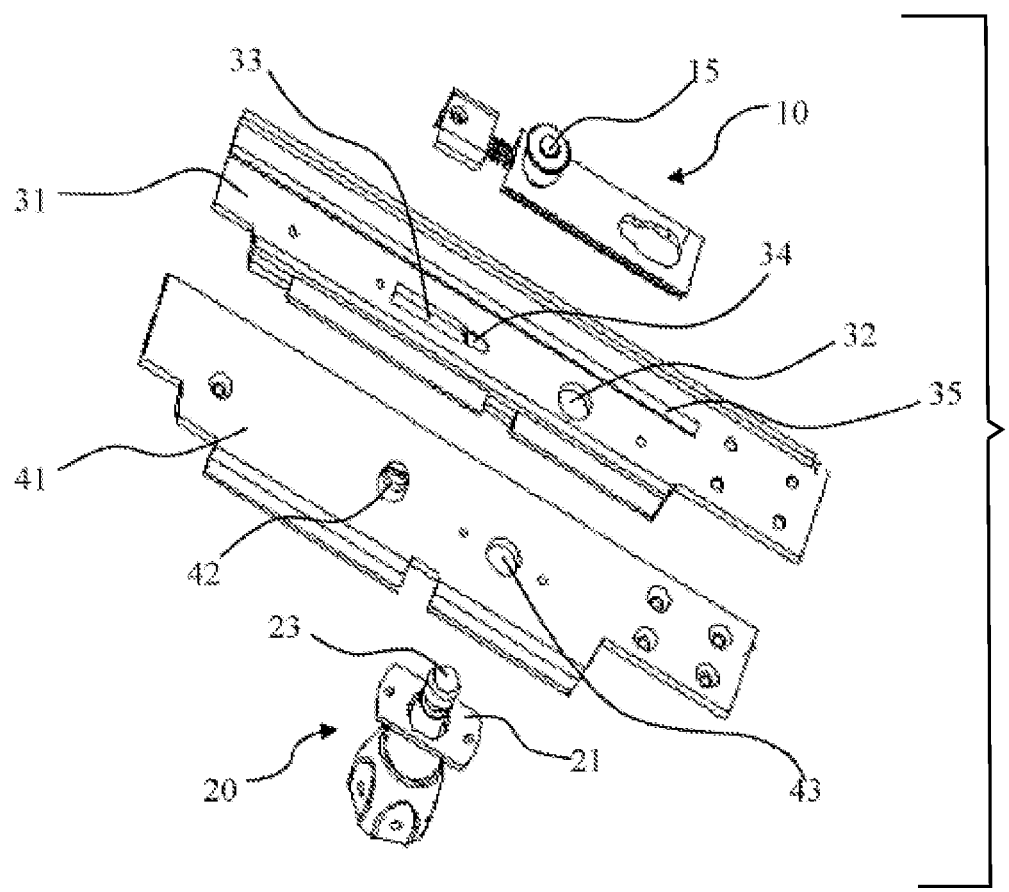
FIG. 4 is a local exploded structure diagram of a display screen in FIG. 3.

The invention further provides a display screen, and as shown in FIG. 3 and FIG. 4, the display screen of the embodiment comprises a first display unit profile 30, a second display unit profile 40 and the connecting device of the abovementioned embodiment. The first display unit profile 30 is provided with a first connecting part 31. The second display unit profile 40 is provided with a second connecting part 41. A first fixed part 11 is fixedly connected with the first connecting part 31, a second fixed part 21 is fixedly connected with the second connecting part 41, the first connecting part 31 is positioned between the second connecting part 41 and a first movable part 12, and the first connecting part 31 is provided with a first avoiding through hole 32 for avoiding a second movable part 22. The display screen of the embodiment reduces the amount of labor and improves mounting efficiency.

Figure 5:
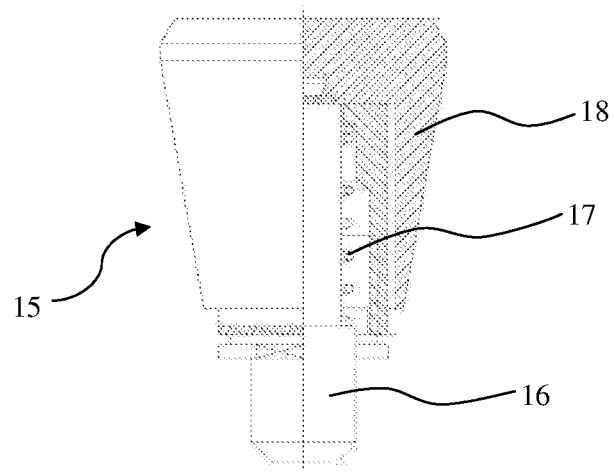
FIG. 5 is a local sectional view of a locking device in a first connecting member of a display screen in FIG. 3.

As shown in FIG. 4 and FIG. 5, in the embodiment, a first connecting member 10 further comprises a locking device 15 provided on the first movable part 12, the locking device 15 comprises a locking pin 16 and a second elastic member 17, acting force of the second elastic member 17 over the locking pin 16 faces the second connecting part 41, the first connecting part 31 is provided with a second avoiding through hole 33 for avoiding the locking pin 16, a hole wall of the second avoiding through hole 33 is provided with a sliding chute 34 which allows the locking pin 16 to move, the sliding chute 34 is positioned between the second avoiding through hole 33 and the first avoiding through hole 32, a chute bottom of the sliding chute 34 is deviated from the second connecting part 41, a pressing bump 42 extending towards the second avoiding through hole 33 is provided on the second connecting part 41, the locking pin 16 has a first locking state of extending into the second avoiding through hole 33 and being stopped by the hole wall of the second avoiding through hole 33 and a second locking state of contacting with the pressing bump 42 to move into the sliding chute 34 and being stopped by a chute wall of the sliding chute 34, and when the locking pin 16 is in the first locking state, the first movable part 12 is in a separation state; and when the locking pin 16 is in the second locking state, the first movable part 12 is in a connection state.

With adoption of the structure, before the first display unit profile 30 and the second display unit profile 40 are mounted, the locking pin 16 is in the first locking state, the first movable part 12 is in the separation state, the first connecting part 31 and the second connecting part 41 move towards each other, the second movable part 22 penetrates through the first avoiding through hole 32 and extends into a penetration hole area 14a, the pressing bump 42 contacts with the locking pin 16 at the same time, and applies force for overcoming acting force of the second elastic member 17 to the locking pin 16, the locking pin 16 shifts out of the second avoiding through hole 33 and extends into the sliding chute 34 to finally enter the second locking state, and at this moment, the second movable part 22 is positioned in a locking hole area 14b and the first movable part 12 is in the connection state, so that the first display unit profile 30 is connected with the second display unit profile 40; and the second movable part 22 is screwed to stably connect the first display unit profile 30 with the second display unit profile 40.

As shown in FIG. 4, in the embodiment, the first connecting part 31 is provided with a guide groove 35 extending in the second direction, and the first movable part 12 is provided with a guided part extending into the guide groove 35. With adoption of the structure, the first movable part 12 may conveniently move according to a predetermined trajectory. As shown in FIG. 5, in the embodiment, the locking device 15 further comprises a handheld handle 18, and the handheld handle 18 is fixed on the first movable part 12 to conveniently drive the first movable part 12 to overcome elasticity of the first elastic part 13. As shown in FIG. 4, in the embodiment, the second connecting part 41 is positioned between the second fixed part 21 and the first connecting part 31 to avoid influence of the second fixed part 21 on seamless jointing of the second connecting part 41 and the first connecting part 31, and the second connecting part 41 is provided with a third avoiding through hole for avoiding the second movable part 22.

The above is only the preferred embodiment of the invention and not intended to limit the invention, and for those skilled in the art, the invention may have various modifications and variations. Any modifications, equivalent replacements, improvements and the like made within the spirit and principle of the invention shall fall within the scope of protection of the invention.

The invention claimed is:
1. A connecting device, comprising:
a first connecting member, comprising a first fixed part, a first movable part provided in a manner of moving in a first direction and a first elastic part positioned between the first fixed part and the first movable part, the first fixed part being provided with a first component connecting part and the first movable part being provided with a mounting through hole which is through in a second direction perpendicular to the first direction; and a second connecting member matched with the first connecting member, and provided with a second component connecting part and an accommodation groove for accommodating a hole wall of the mounting through hole, the second connecting member having an inward extension state of extending into the mounting through hole and an outward shifting state of shifting out of the mounting through hole, the first movable part having a connection state of causing the hole wall of the mounting through hole to extend into the accommodation groove and a separation state of causing the hole wall of the mounting through hole to extend out of the accommodation groove and the first movable part being in the connection state under an action of the first elastic part;

wherein the second connecting member comprises a second fixed part and a second movable part provided on the second fixed part in the manner of moving in the second direction, the second component connecting part is formed on the second fixed part, the accommodation groove is formed in the second movable part, and the second movable part has the inward extension state and the outward shifting state.

2. The connecting device according to claim 1, wherein the accommodation groove is an annular groove, the second fixed part is provided with a threaded hole which is through in the second direction, the second movable part comprises a hanger rod, the accommodation groove is formed in the hanger rod, and the hanger rod is provided with an external threaded section matched with the threaded hole.

3. The connecting device according to claim 2, wherein the second movable part further comprises a screwing handle fixedly connected with the hanger rod, the second fixed part is positioned between the screwing handle and the first connecting member, and multiple handholding grooves are formed in a circumferential direction of the screwing handle at intervals.

4. The connecting device according to claim 1, wherein the mounting through hole comprises a penetration hole area and a locking hole area which are distributed in the first direction, an area of the locking hole area is smaller than an area of the penetration hole area, and when the first movable part is in the connection state, the second movable part is positioned in the locking hole area and a hole wall of the locking hole area extends into the accommodation groove; and when the first movable part is in the separation state, the second movable part is positioned in the penetration hole area.

5. The connecting device according to claim 1, wherein the first elastic part is a first compression spring.

6. The connecting device according to claim 1, wherein both the first component connecting part and the second component connecting part are screw penetration through holes.

7. A display screen, comprising:
a first display unit profile with a first connecting part; and
a second display unit profile with a second connecting part, wherein the display screen further comprises:
the connecting device according to claim 1, wherein the first fixed part is fixedly connected with the first connecting part, the second connecting member is fixedly connected with the second connecting part, the first connecting part is positioned between the second connecting part and the first movable part and the first connecting part is provided with a first avoiding through hole for avoiding the second connecting member.

8. The display screen according to claim 7, wherein the first connecting member further comprises a locking device provided on the first movable part, the locking device comprises a locking pin and a second elastic member, an acting force of the second elastic member over the locking pin faces the second connecting part, the first connecting part is provided with a second avoiding through hole for avoiding the locking pin, a hole wall of the second avoiding through hole is provided with a sliding chute which allows the locking pin to move, the sliding chute is positioned between the second avoiding through hole and the first avoiding through hole, a chute bottom of the sliding chute is deviated from the second connecting part, a pressing bump extending towards the second avoiding through hole is provided on the second connecting part, the locking pin has a first locking state of extending into the second avoiding through hole and being stopped by the hole wall of the second avoiding through hole and a second locking state of contacting with the pressing bump to move into the sliding chute and being stopped by a chute wall of the sliding chute, and when the locking pin is in the first locking state, the first movable part is in the separation state; and when the locking pin is in the second locking state, the first movable part is in the connection state.

9. The display screen according to claim 7, wherein the first connecting part is provided with a guide groove extending in the second direction, and the first movable part is provided with a guided part extending into the guide groove.

10. A display screen, comprising:
a first display unit profile with a first connecting part; and
a second display unit profile with a second connecting part, wherein the display screen further comprises:
a connecting device, wherein the connecting device comprises a first connecting member, comprising a first fixed part, a first movable part provided in a manner of moving in a first direction and a first elastic part positioned between the first fixed part and the first movable part, the first fixed part being provided with a first component connecting part and the first movable part being provided with a mounting through hole which is through in a second direction perpendicular to the first direction; and a second connecting member matched with the first connecting member, provided with a second component connecting part and an accommodation groove for accommodating a hole wall of the mounting through hole, the second connecting member having an inward extension state of extending into the mounting through hole and an outward shifting state of shifting out of the mounting through hole, the first movable part having a connection state of causing the hole wall of the mounting through hole to extend into the accommodation groove and a separation state of causing the hole wall of the mounting through hole to extend out of the accommodation groove and the first movable part being in the connection state under an action of the first elastic part;

wherein the first fixed part is fixedly connected with the first connecting part, the second connecting member is fixedly connected with the second connecting part, the first connecting part is positioned between the second connecting part and the first movable part, and the first connecting part is provided with a first avoiding through hole for avoiding the second connecting member.

\* \* \* \* \*